W. WESTLAKE.

Platforms for Stoves.

No. 6,192. Reissued Dec. 22, 1874.

WITNESSES:

A. W. Bond

L. L. Bond

INVENTOR:

William Westlake

UNITED STATES PATENT OFFICE.

WILLIAM WESTLAKE, OF CHICAGO, ILLINOIS.

IMPROVEMENT IN PLATFORMS FOR STOVES.

Specification forming part of Letters Patent No. 119,676, dated October 3, 1871; reissue No. 6,192, dated December 22, 1874; application filed October 22, 1873.

*To all whom it may concern:*

Be it known that I, WILLIAM WESTLAKE, of the city of Chicago, in the county of Cook and State of Illinois, have invented a new and useful Improved Zinc Board or Platform for Stoves, of which the following is a full description, reference being had to the accompanying drawing making a part of this specification, in which—

Figure 1:
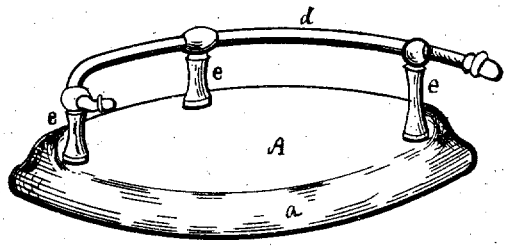
Figure 2:
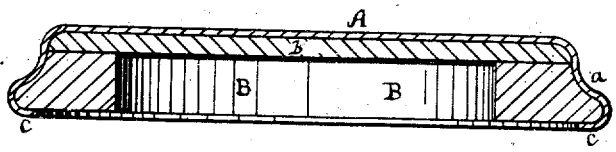
Figure 3:
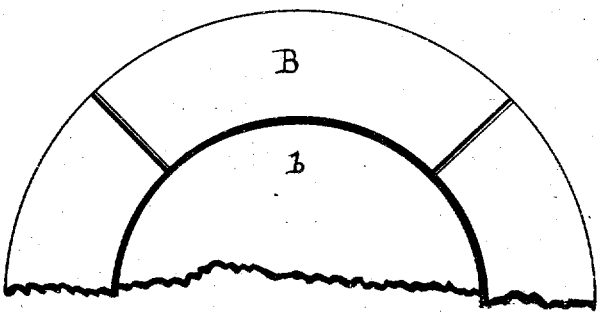
Figure 4:
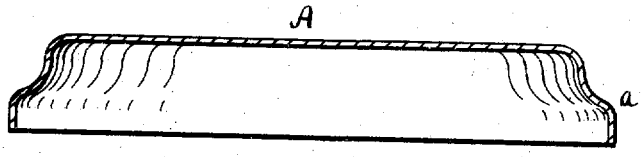
Figure 5:
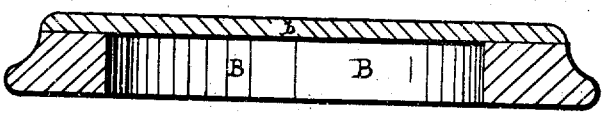

Figure 1 is a perspective view of one form of my improvement; Fig. 2, a vertical cross-section of the same; Fig. 3, a bottom view of the interior shown in Figs. 2 and 5; Fig. 4, a vertical section of a sheet of metal ready to receive this interior of the platform; Fig. 5, a vertical section of an interior or supporting part of the platform ready to be inserted within the exterior shown in Fig. 4.

This invention is an improvement in the round or oval platform for stoves for which Letters Patent of the United States, No. 112,996, were issued to me on the 21st of March, 1871.

In that platform the sheet metal had no support, except where the legs of the stove were liable to come; hence, while the unsupported center might in use retain its shape, the exposed edge of the platform would become bruised. The wood supports in that platform were secured in place by means of strips of metal soldered to the edge of the zinc and nailed to the wood.

This invention consists, first, in providing the round or oval exterior metal portion of the platform, and especially all the outer part thereof, with a suitable supporting interior, and so combining the metal exterior, which is made of a single piece, with the interior that the two shall be secured together without the use of nails, screws, or solder; second, in so arranging and connecting the parts composing the interior, and combining same with a metal exterior secured to the interior, as above described, that the platform will be prevented from warping.

The metal or exterior portion of the platform can most conveniently be made from a sheet of zinc, either round or oval. This sheet is to be of such size that it can be, at the edge, turned over and under the edge of the interior or supporting part of the platform, and thus these two parts will be held together without the use of nails, screws, or solder, and by the turned under edge of the metal only.

Within the metal portion of the platform is placed an interior supporting body, and the two parts are so formed and fitted to each other that the interior supports all exposed parts of the exterior.

In the drawings, A represents a piece of zinc, either round or oval, which forms the exterior portion of the platform; it has a part, *a*, which can be either ornamental or plain, and may be an inch and a half wide, more or less, as may be desired. This part *a* is of such width that it will cover, and can be turned under, the edge of the interior. The desired form can be given to it by any suitable means.

In Figs. 2, 3, and 5 is represented an interior which I use, adapted to the exterior shown in Fig. 4.

B B represent pieces of wood, four of which is a convenient number. The grain of these pieces should run in the direction of their length; they may be cut from boards, and may be about half an inch thick. These pieces B are fastened securely to a thin board or boards, *b*. The edge of the interior is to be formed so as to correspond with that of the part *a*, which, when the interior is of wood, can most conveniently be done in a lathe.

To complete the platform, the interior is to be inserted within the metal exterior A, and the two parts can be easily secured together by turning the edge of the latter under the former, as shown at *c*, Fig. 2.

When the interior is made of the pieces B *b*, and the exterior is secured to the interior as described, warping or injurious shrinkage will be prevented.

The part *a* can conveniently be formed by spinning, and while in the lathe it can be highly polished without material expense.

The best way to turn the edge of the metal A under the edge of the interior is by spinning.

I thus form a round or oval platform, the exposed metal portions of which are suitably supported, having a continuous edge without seam or joint, the two parts of which are held together by the turned-under edge of the metal.

If desired, the platform, or a part of it, may be provided with a guard and foot-rest, *d*, placed upon or in supports *e*. (Seen in Fig. 1.)

What I claim as new is as follows:

1. As an improved article of manufacture, the platform for stoves consisting of a sheet-metal exterior, A, combined with a supporting body or interior, the edge of the former being turned over and under the edge of the latter, whereby the interior is held in place without the use of nails, screws, or solder, and the sheet provided with a solid bearing around its edge, as set forth.

2. The combination, in a stove-platform, of a circular or oval interior or supporting body, consisting of the pieces B *b*, with the sheet-metal exterior A, applied thereto substantially as and for the purpose set forth.

WILLIAM WESTLAKE.

Witnesses:
E. A. WEST,
O. W. BOND.